United States Patent [19]

Hayano et al.

[11] 4,061,821
[45] Dec. 6, 1977

[54] SEMIPERMEABLE COMPOSITE MEMBRANES

[75] Inventors: Fusakazu Hayano; Yasuo Hashino; Kiyoshi Ichikawa, all of Fujishi, Japan

[73] Assignee: Asahi Kasei Kogyo Kabushiki Kaisha, Osaka, Japan

[21] Appl. No.: 750,544

[22] Filed: Dec. 14, 1976

[30] Foreign Application Priority Data

Dec. 29, 1975 Japan .................................. 50-156030
Dec. 30, 1975 Japan .................................. 50-156832

[51] Int. Cl.² .............................................. B01D 31/00
[52] U.S. Cl. .............................. 428/304; 210/22 R; 210/23 H; 210/321 R; 264/182; 428/317
[58] Field of Search ............... 210/22 R, 23 H, 321 R; 428/304, 306, 317; 264/182

[56] References Cited

U.S. PATENT DOCUMENTS

| 3,644,139 | 2/1972 | Schwarz ................................ 428/306 |
| 3,871,950 | 3/1975 | Hashino et al. ...................... 428/398 |
| 3,933,561 | 1/1976 | Larson et al. ........................ 428/304 |

Primary Examiner—William J. Van Balen
Attorney, Agent, or Firm—Armstrong, Nikaido & Marmelstein

[57] ABSTRACT

A semipermeable composite membrane which shows only a small reduction of water permeability even when it is subjected to one time hot water treatment or drying treatment is provided according to the method of the present invention. Said semipermeable composite membrane consists of a porous substance and a reinforcing material embedded therein. Said porous substance has a porous region of network structure at least in one part thereof and numbers of voids in said porous region. Said reinforcing material is a fabric in case of flat type membrane or a braid having a central hollow portion in case of hollow fiber type membrane which is embedded in the wall of the membrane. Said method comprises impregnating said reinforcing material with a polymer solution and treating the impregnated reinforcing material with a coagulating liquid.

9 Claims, 13 Drawing Figures

SEMIPERMEABLE COMPOSITE MEMBRANES

BACKGROUND OF THE INVENTION

This invention relates to a membrane which shows only a small reduction of water permeability during the time of hot water treatment or drying treatment and a method for producing such a membrane.

A membrane which is constructed with a porous substance at least one part of which substance forms porous network region having pore sizes in the range of 500A – 5μ and containing numbers of voids having a diameter greater than 10μ in said porous region, has heretofore been known as a semipermeable membrane which shows higher water permeability when it is used as it is in the wet state and at a lower temperature (see U.S. Pat. No. 3,871,950 one of which inventors is same as one of those of the present application).

The structure of such a membrane can be observed by way of electronmicroscopic photograph of the cross-section of membrane and the porous substance is made of a polymer. The void herein referred to means a part of the porous substance at which the porous substance is lacking in an area corresponding to a circle having a diameter greater than 10μ, and the porous region of network structure means a region of the porous substance made of a polymer existing while surrounding numbers of above-mentioned voids and forming network structure by the mutual connection of adjacent pores having diameters in the range of 500A – 5μ.

In addition to collodion membranes, gel-cellophane membranes, etc., membranes of many kinds of high molecular weight polymers such as collagen membranes, dextrane membranes acrylonitrile polymer membranes have been brought into application recently and their use is now under development not only in the laboratory scale but also in a wide variety of application fields such as foodstuff industries, medicals industries, electronics industries, etc. as well as in the public nuisance prevention art.

With regard to the shapes of such membranes, there are many kinds such as flat membranes obtained by casting a polymer solution upon a flat base plate followed by removing the solvent (for the polymer), tubular membranes obtained by coating a cylindrical supporting material with a polymer solution, also hollow fiber membranes obtained by spinning a polymer solution through a spinning nozzle having a circular orifice, etc.

However, any of these membranes has restriction in the actual use because the water permeability is extremely reduced and/or the shape of membrane cannot be maintained when they are brought into contact with hot water or they are dried.

Accordingly, it is an object of the present invention to provide membranes which are very small in the reduction of water permeability even by the hot water treatment or drying treatment without injuring the characteristic feature of the past membrane which has a higher water permeability due to possession of a large number of voids as well as a porous region of network structure as compared with the membranes having no such a region.

It is another preferable object of the present invention to provide microporous ultrafilatration membranes.

After repetition of a comprehensive experimentation and deliberation, we have found semipermeable membranes having superior resistance to hot water and to drying which show a ratio of the water permeability in one time treatment with hot water at 80° C or drying at 20° C to the water permeability before the treatment, of 0.3 or higher. Such superior value has never been experienced in case of conventional membranes. These are the membranes which use a fabric as reinforcing material in case of flat type, and a braid having a central hollow portion as reinforcing material in case of hollow fiber type. Further a rounded fabric can be also used as reinforcing material to form a membrane of a tubular type. In these membranes, these reinforcing materials are placed in the wall portion of membranes; at least one part of the porous substance constituting the membranes forms a porous region of network structure having pore sizes in the range of 500A – 5μ, and a large number of voids having diameters greater than 10μ are formed in said porous region. Further, objective membranes can not be obtained from those having at least a portion of these reinforcing materials outside the wall portion of the membrane or those in which the porous substance constituting the membrane is different from the above-mentioned.

In order to give understanding more fully of the nature of the membranes of the present invention and the process for producing the same, a process for producing a semipermeable composite membrane of hollow fiber type containing a braid will be illustrated as one embodiment of the present invention.

Further the disclosure of said U.S. Pat. No. 3,871,950 is incorporated herein as a reference.

Figure 1:
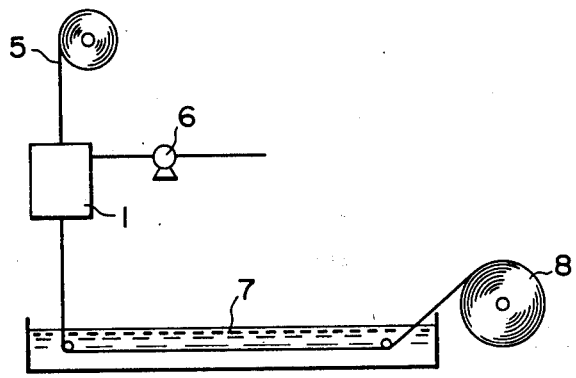
FIG. 1 is a schematic view of the flow sheet of spinning process for preparing a hollow fiber type semipermeable composite membrane containing a braid as one embodiment of the present invention.
Figure 2:
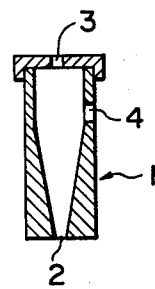
FIG. 2 is a cross-sectional view of the spinning nozzle employed in FIG. 1.

The spinning nozzle 1 illustrated in the schematic flow sheet of spinning process shown in FIG. 1 has a structure shown in FIG. 2. The spinning nozzle 1 has a round orifice 2, an inlet for a braid 3 and an inlet 4 for a polymer solution. A braid 5 having a central hollow portion and wound up on a roll is introduced in the spinning nozzle 1, and a polymer solution is introduced in the spinning nozzle 1 by way of a gear pump 6 and contacted with the braid inside the spinning nozzle 1.

From the circular orifice 2, the polymer solution and the braid are taken out simultaneously to impregnate the braid with the polymer solution way to the wall of the hollow portion side of the braid. A hollow fiber type semipermeable composite membrane is obtained by leading the braid taken out from the spinning nozzle into a vessel 7 containing a liquid which does not dissolve the polymer i.e. a coagulation liquid, preferably after running through a gas space (e.g. an air space), and wound up on a roll 8.

The composition of polymer solution and the coagulation condition employed in this case are the same as those of the conventional membrane as disclosed in said U.S. Pat. No. 3,871,950, e.g. membranes of porous substance at least one part of which has a porous region of network structure, having pore sizes in the range of 500A – 5μ, and containing a large number of voids having sizes greater than 10μ inside and porous region.

By referring to the condition for producing the past semipermeable membrane, it is possible to produce various kinds of semipermeable membrane containing a reinforcing material. For example by applying a process disclosed in said U.S. Pat. No. 3,871,950 in the production of hollow fiber type semipermeable composite membrane i.e. by using a nitric acid solution of acrylonitrile polymer as a spinning solution, and a coagulation bath containing water as a principal material, as a coagulant, and by allowing the coagulation bath to act upon a hollow filamentary substance obtained by extruding the polymer solution, from the outside of the substance, there is formed a structure of hollow fiber type semipermeable membrane having a porous region of about 20μ in thickness containing no voids, on the outer surface which has contacted with the coagulation bath, and another porous region adjacent to said region, having regularly arranged voids of greater than 10μ size. Further the micro-structures of individual regions will be explained further. The former porous region containing no voids (existing on the outer surface of the hollow fiber in this case) is the one which has the porous structure in which the mean sizes of pores are continuously and gradually reduced with the approach to the surface i.e. gradient type porous region, and which contains no clear skin layer. The latter porous region containing voids is the one having a network structure in which the size of network is greater than 500A and smaller than 5μ, preferably in the order of 1μ. This region exists surrounding the voids.

The voids are parts at which the polymer substance forming the hollow fiber membrane is lacking. The direction of the maximum diameter of these voids points to nearly the center of the hollow fiber membrane. The cross-section perpendicular to the direction of the maximum diameter of these voids is nearly circular and the maximum diameter of the section perpendicular to the direction of maximum diameter of the voids is less than half the maximum diameter of these voids. Moreover, the sizes of these voids are nearly equal when the distances from the center of the hollow fiber membrane to the voids are nearly equal.

Further when the coagulating liquid is supplied also from the inside surface of the hollow fiber type membrane, the above-mentioned gradient type porous region is formed also in the inside surface of the hollow fiber type membrane. Thus the gradient type porous region can exist in the outer surface, in the inner surface or in both the outer and inner surfaces and have a thickness in the range of 100μ – 1μ preferably 30 – 40μ. The mean pore size becomes gradually greater from the surface having contacted with the coagulating bath to the inside of the membrane and on the side closer to the porous region containing voids, and the size is less than 5μ and greater than 500A preferably in the order of 1μ. In the outer surface, the size is less than 0.1μ and greater than 10A. Due to the presence of such gradient type porous region, clogging of semipermeable membrane hardly occurs. Furthermore, membranes having such gradient type porous region of said minimum pore size range belong to the category of ultrafiltration membranes.

By using a reinforcing material in the present invention, the effectiveness of preventing reduction of water permeability after hot water treatment or drying treatment is notably exhibited in such ultrafiltration membranes.

The above explanation has been made referring to a hollow fiber type semipermeable composite membrane, but a similar matter can be said also in case of flat type semipermeable membranes.

Figure 3:
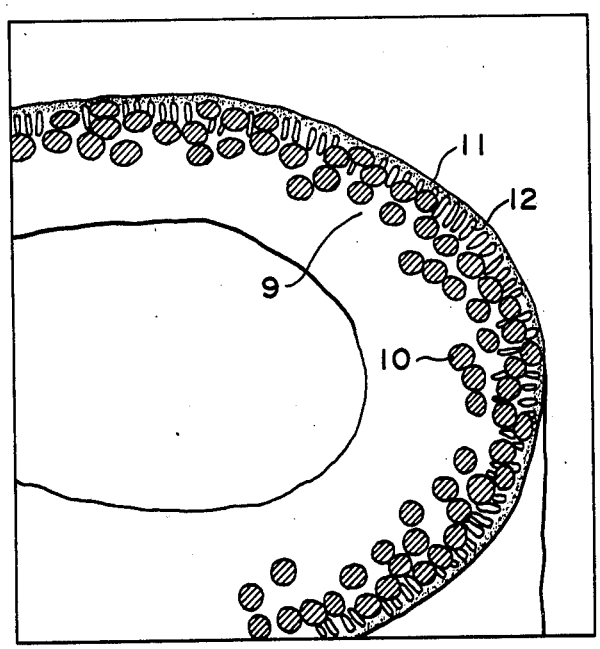
FIGS. 3 – 5 show sketches of the cross-sections of hollow fiber type semipermeable composite membranes containing braid, of the present invention.

FIG. 3 shows the cross-sectional structure of an acrylonitrile hollow fiber type semipermeable membrane obtained according to Example 1 mentioned below. In this Example, since the coagulation is carried out from the outer side, a gradient type porous region is formed in the outer surface of the hollow fiber membrane. In the drawing, numeral 9 shows a porous region having voids, 10 shows a cross-section of a braid used as a reinforcing material, 11 shows the surface which has contacted wih a coagulation liquid and 12 shows voids. It is observed that the fiber cross-sections of the braid are located in the extreme proximity of the gradient type porous region. In case of such a hollow fiber type semipermeable composite membrane, its water permeability hardly changes even when it is treated with hot water. Further a semipermeable composite membrane having been once treated with hot water hardly reduces its water permeability even after it is dried.

Figure 4:
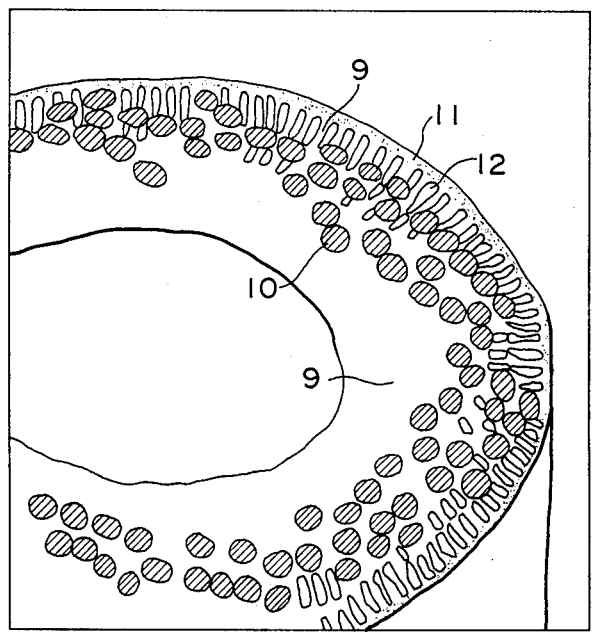

In contrast, in case of a hollow fiber type semipermeable composite membrane which is obtained by using a spinning nozzle having an enlarged diameter and shows such a cross-sectional structure as that shown in FIG. 4 (the membrane of specific Example 3), the fiber cross-sections 10 of the braid are apart to a certain extent from the gradient type porous region. In case of such a semipermeable membrane, the effect of reinforcing material on the water permeability is weakened compared with the case of FIG. 3, and a certain extent of reduction of water permeability is seen at the time of hot water treatment at a temperature higher than 80° C, although the reduction is not so large as in the case of the past membrane.

Figure 5:
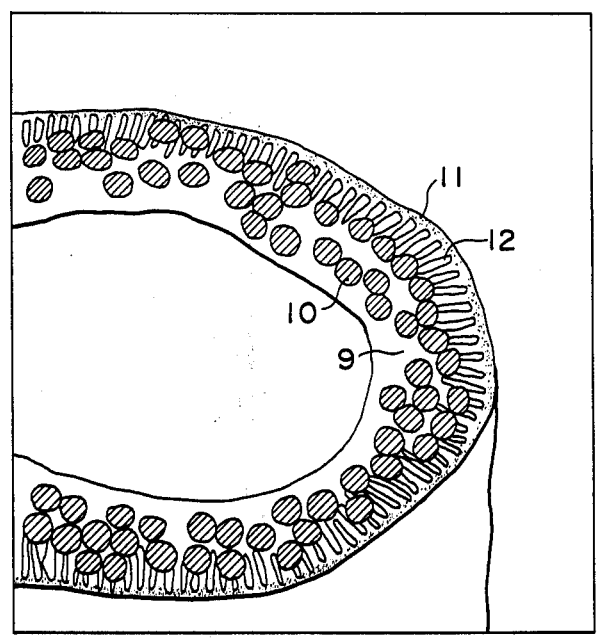

FIG. 5 shows the cross-section of the composite membrane of the present invention obtained according to the method of specific Example 2.

Figure 6:
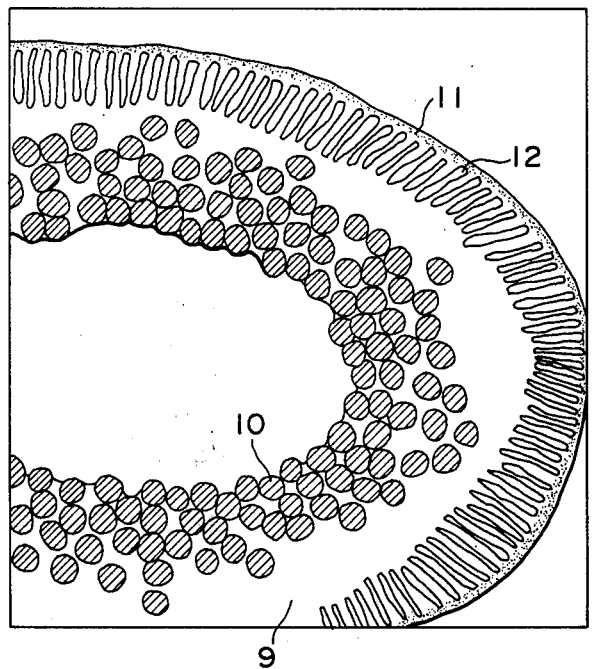
FIG. 6 shows a sketch of the cross-section of a hollow fiber type semipermeable composite membrane containing a braid as a comparative example of the present invention.

FIG. 6 shows the cross-section of the structure of a hollow fiber type semipermeable composite membrane having a thick membrane formed on a bulky braid having a central hollow space according to the past process as shown in Comparative example 2 hereinafter described described, wherein numeral 9 shows a porous region having voids, 10 shows a braid and 11 shows the surface contacting with a coagulation bath and a gradient type porous region is formed. In case of polyacrylonitrile hollow fiber type semipermeable composite membranes having the cross-section of FIG. 6, the effect of braid as a reinforcing material is recognizable to a certain extent, but when such a membrane is treated with hot water at a temperature higher than 80° C, the water permeability is reduced down to a value in the range of 1/5 to ⅛ the initial water permeability.

Further in case of plyacrylonitrile hollow fiber type semipermeable membranes containing no embedded braid, the water permeability becomes almost zero when the membrane is treated with hot water at a temperature higher than 80° C.

Next, a semipermeable composite membrane of a flat type will be described as another embodiment of the present invention.

Figure 7:
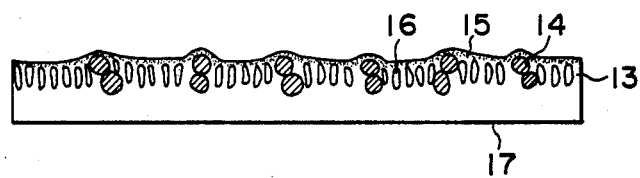
FIG. 7 shows a sketch of the cross-section of a flat type semipermeable composite membrane of the present invention.

The composite membrane having the cross-sectional structure shown in FIG. 7 is the one obtained according to the process of Example 4 hereinafter described. In the drawing, numeral 13 shows a porous region containing voids, of semipermeable membrane, 14 shows the cross-section of filaments of a fabric, 15 shows a gradient type porous region, 16 shows voids and 17 shows the surface having contacted with a flat base plate. In case of the composite membrane having such a cross-sectional structure, the water permeability is hardly reduced even when the membrane is treated with hot water, and rather shows a tendency of increase. The composite membrane having been once treated with hot water hardly shows the reduction of the water permeability even when the membrane is dried.

Figure 8:
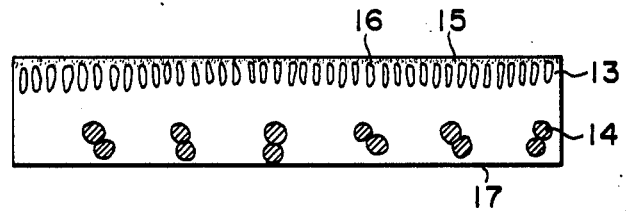
FIG. 8 shows a sketch of the cross-section of a flat type semipermeable composite membrane as a comparative example of the present invention.

FIG. 8 shows the cross-sectional structure of the composite membrane obtained according to the method of Comparative example 4 hereinafter described. The symbols of numerals denote the same things as in case of FIG. 7. The filaments of fabric are embedded in the semipermeable membrane, but since they are separated apart from the gradient type porous region, their effect is weakened. When the membrane is treated with hot water, the water permeability is reduced down to a value in the range of 1/5 to ⅛ of the initial water permeability. In case of Comparative example 1, a semipermeable membrane containing no embedded fabric is prepared by the water permeability becomes almost zero when the membrane is treated with hot water at a temperature higher than 80° C.

Figure 9:
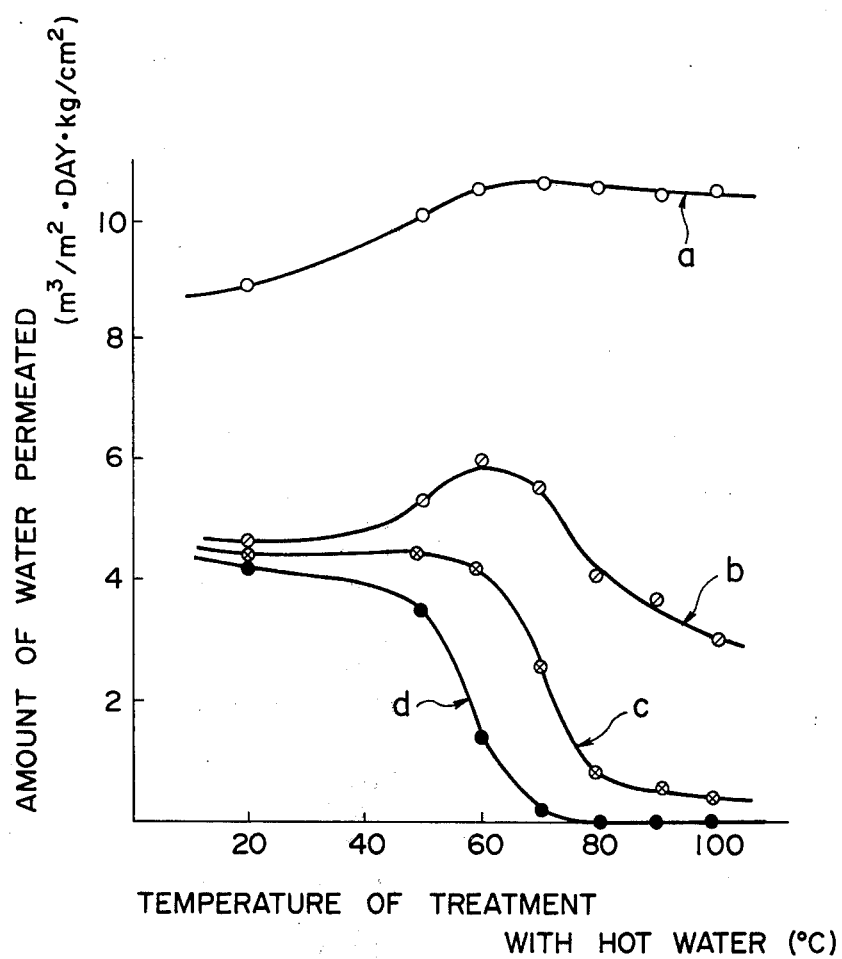
FIGS. 9 and 10 show a relationship between the temperatures of hot water treatment and the water permeability after treatment, respectively.

FIG. 9 shows the relationship between the temperature of hot water treatment and the water permeability with regard to the above-mentioned examples. In the ordinate, water permeabilities ($m^3/m^2 \cdot day \cdot Kg/cm^2$) are taken and in the abscissa, temperatures of hot water treatment (°C) are taken and curve $a$ is a curve shown by the composite membrane of FIG. 3 (Example 1), curve $b$ is a curve shown by the composite membrane of FIG. 4 (Example 3), curve $c$ is a curve shown by the composite membrane of FIG. 6 (Comparative example 2) and curve $d$ is a curve shown by a hollow fiber type semipermeable membrane wherein no reinforcing material is used (Comparative example 1).

Figure 10:
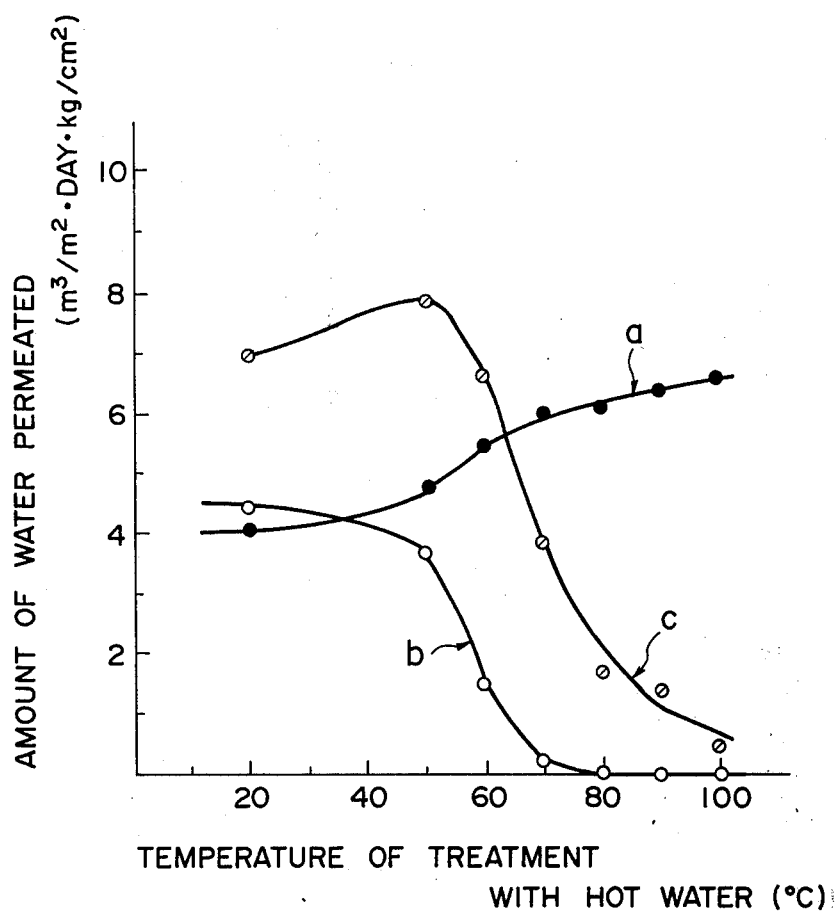

FIG. 10 shows the relationship between the condition of hot water treatment and the resulting water permeability with regard to the flat type semipermeable composite membrane. In the drawing, $a$ shows a curve for the semipermeable composite membrane of FIG. 7 (Example 4), $b$ shows a curve for the semipermeable membrane containing no embedded reinforcing material (Comparative example 3), and $c$ shows a curve for the semipermeable membrane of FIG. 8 (Comparative example 4).

Figure 11:
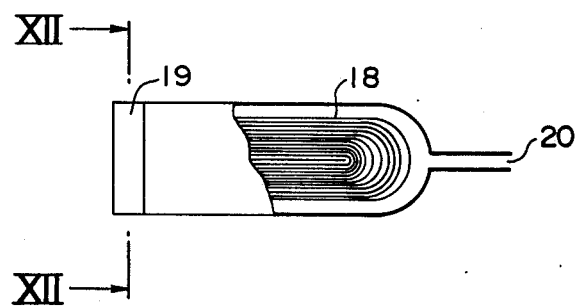
FIG. 11 shows the cross-sectional view of a part of an apparatus (filtration module) for measuring the water permeability.
Figure 12:
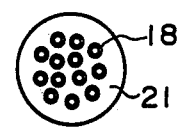
FIG. 12 shows the cross-sectional view of the apparatus of FIG. 11 taken along the line XII — XII.
Figure 13:
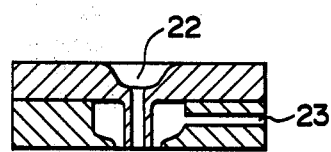
FIG. 13 shows the cross-sectional view of a spinning nozzle.

FIG. 11 shows an elevation of the filtration module prepared for measuring water permeability and also shows partly a cross-section by cutting off. FIG. 12 shows a cross-section of the apparatus of FIG. 11 taken along the line of XII — XII. In the drawing, numeral 18 shows a hollow fiber type semipermeable membrane, 19 shows a part where adhesion is effected, and 20 shows an inlet for water. FIG. 13 shows a cross-section of one example of a spinning nozzle for producing a hollow fiber type semipermeable membrane which is obtained by coagulation from both the inside and the outside and used in Comparative example 1 hereinafter described. In the drawing, numeral 22 shows an inlet for sending a coagulation liquid and 23 shows an inlet for a spinning solution.

From the foregoing, it is clearly observable that the influence of hot water treatment upon the water permeability varies greatly depending upon whether the reinforcing material is existing or not and upon where the position of the reinforcing material is. In other words it is clearly indicated that there is no reduction of water permeability by the hot water treatment when a braid as a reinforcing material is located in the viscinity of a gradient type porous region.

The location of the reinforcing material which provides such an effectiveness that no reduction in the water permeability of the membrane occurs even when hot water treatment or drying treatment is carried out, varies depending upon the raw material for the membrane, the structure of the membrane, etc., and hence cannot be specified, but in case of a membrane having a gradienttype porous region, generally the nearer to the gradient-type porous region the location, the greater the effectiveness.

Accordingly, in case of a membrane having a gradient-type porous region, it is possible to bring the ratio of the water permeability after one time treatment with hot water at 80° C or drying at 20° C to the water permeability before the treatment to a value of 0.3 or higher by placing the reinforcing material sufficiently close to the gradient-type porous region.

In case of a membrane having no gradient-type porous region, it is necessary to embed a reinforcing material in the membrane so as to be able to bring the ratio of the water permeability after the treatment with hot water at 80° C or drying at 20° C to the water permeability before the treatment to a value of 0.3 or higher.

In addition, the location of the reinforcing material can be controlled by properly selecting the diameter of the holes of nozzle, the diameter of braid, the viscosity of the polymer solution, etc.

As for the braid employed in the present invention, any kind can be employed so long as it has a hollow portion in the central part, but, in order to make a braid exhibit the effectiveness to a full extent, it is preferable to select a braid consisting of monofilaments and having a thin thickness and an inner diameter in the range of 0.5 - 10 mm is preferable though thin multifilament yarns, etc. can also be used. Further, as for the fabric employed in the present invention, any king of knit cloths, woven-cloths, non-woven cloths and screens can be employed. As for the raw material for these braids or cloths, any kind can be employed so long as it is not of a kind which is completely dissolved in the solvent used, to lose its shape, at the time of preparing semipermeable membranes, but usually, polyesters, nylons, acrylonitrile polymers, polyvinyl alcohol, cellulose acetate, rayon, cuprammonium rayon, polyolefins such as ethylene polymers and propylene polymers, vinyl chloride polymers, carbon fibers, glass fibers, stainless steel, etc. can be employed. Among them, polyesters, acrylonitrile polymers, ethylene polymers and propylene polymers in the form of monofilaments are particularly preferable because thin but strong monofilaments are obtained from such polymers and yet the tendency of occurrence of fluffs is less.

As for the raw material employed for the semipermeable membrane in the present invention, those which have heretofore been employed, for example, copolymers mainly of acrylonitrile, cellulose acetate, polyamides, polyurethanes, polysulfones, etc. can be mentioned, but among them, copolymers mainly of acrylonitrile are particularly preferable.

The hollow fiber type semipermeable composite membrane of the present invention have specific features and performances as mentioned above. However, even from the raw materials from which practical semipermeable membranes of hollow fiber type could not have heretofore been prepared, on account of insufficient strength of the resulting membrane in spite of superior water permeability, or on account of too low viscosity of solution for spinning, hollow fiber type semipermeable membranes which stand sufficiently for practical use can be obtained according to the method of the present invention.

Further, it has been known that there is a corelationship between the concentration of polymer solution and the water permeability of semipermeable membrane, and a semipermeable membrane prepared from a solution having a lower concentration has a higher water permeability. However, if a solution concentration is low, the strength of the resulting semipermeable membrane is low, and hence, in order to obtain a practically useful semipermeable membrane, it has been impossible to reduce the solution concentration to a value less than a certain value. Whereas, according to the present invention, the mechanical strength of the resulting semipermeable membrane is increased by the reinforcing material, and a strong semipermeable membrane can be readily prepared from a solution having a concentration lower than those employed in the conventional methods, and yet a semipermeable membrane having a greatly improved water permeability of 10 times those of conventional membranes or higher, can be readily prepared by virtue of the effectiveness of the present invention.

Further, the thickness of the semipermeable membrane can be made thinner than those of conventional membranes, and it is also possible to prepare a semipermeable membrane having a cross-sectional structure as shown in FIG. 5.

With regard to the production method, the detailed explanation will be made hereunder.

A hollow fiber type semipermeable composite membrane containing an embedded braid having a central hollow portion is prepared according to a following process: A polymer solution is sent by a gear pump or the like to the liquid reservoir in a spinning nozzle having a round orifice.

At the same time, a braid having a hollow portion and made of monofilaments are inserted from the upper part of the spinning nozzle to effect the contact with the polymer solution and the braid having a hollow portion and made of monofilaments in the liquid reservoir. From the circular orifice, the polymer solution and the braid having a hollow portion and made of monofilaments are taken out simultaneously, and a braid impregnated with the polymer solution is led into a liquid which does not dissolve the polymer to effect coagulation whereby a hollow fiber type membrane containing the braid in or in the neighbourhood of gradient type porous region in a concentric form is obtained.

A semipermeable composite membrane containing an embedded fabric is made according to a following process: According to one method, a polymer solution is cast on a flat base such as a glass plate or an endless belt and a fabric is placed thereupon. After the fabric is brought into a wet state with the polymer solution and embedded completely in the membrane of the polymer solution by virtue of surface tension and yet so embedded as to occupy the situation in the neighbourhood of the surface which contacts with a coagulation liquid, and thereafter the whole is immersed in the coagulation liquid to form a semipermeable membrane.

According to another method, a polymer solution is applied only onto one surface of a fabric placed in air so as to form a thin coating. After the fabric is brought into a wet state by the polymer solution, and the fabric is embedded completely in the membrane of the polymer solution and yet so embedded as to be placed in the neighbourhood of the surface contacting with a coagulation liquid, the resulting whole is immersed in the coagulation liquid.

According to the formed method, a gradient type porous region is former only on one surface of the composite membrane, but according to the latter method, gradient type porous regions are formed on both the surfaces of the composite membrane.

According to these methods, a semipermeable membrane in which at least one surface of the fabric is located in or in the neighbourhood of the gradient type porous region of the above-mentioned semipermeable membrane formed from the polymer solution is obtained.

EXAMPLE 1

Twenty five grams of an acrylonitrile copolymer containing 10% by mol of methyl acrylate residual group was dissolved in 100 ml of a 75% aqueous nitric acid at $-3°$ C, and the resulting solution was defoamed while being maintained at $-3°$ C. The resulting solution was fed through an inlet 4 of nozzle 1 shown in FIG. 2 into nozzle 1 by means of a gear pump 6 shown in FIG. 1. At the same time, a braid 5 having a hollow portion, made of polyester (polyethylene terephthalate) monofilaments and having an outer diameter of 1.8 mm and an inner diameter of 1.4 mm was introduced into the nozzle through the upper part 3 thereof. During the passage of the braid through the nozzle, the braid was impregnated with the solution. The resulting braid coated with the solution was pulled out of an exit 2 of the nozzle having a diameter of 2 mm, and coagulated in a coagulation vessel 7 filled out with water as coagulant and then taken up on a winder 8 to give a hollow fiber type membrane, which had an inner diameter of 1.0 mm and an outer diameter of 2.0 mm and a cross-sectional structure as shown in FIG. 3, which contained a gradient type porous region on the outer side thereof which had been in contact with the coagulation liquid, and also braid and a network porous region having pore sizes in the range of $0.05 - 0.5\mu$ and containing voids of $20 - 150\mu$, on the inner side thereof.

Using this hollow fiber membrane, a filtration module of hollow fiber type semipermeable membranes as shown in FIG. 11 was prepared.

The water permeability was measured under a hydraulic pressure of 1 atm. Further, after treatment with hot water at various temperatures, the respective water permeabilities were measured. The results are shown in Table 1. If the results are shown by means of graph, a curve a shown in FIG. 9 is obtained. Further, after the hollow fiber type membrane was treated with hot water at 80° C and dried, the water permeability was measured to give 8.2 m³/m²·day·Kg/cm³.

Table 1

| Temperature of treatment with hot water (° C) | Water permeability (m³/m² · day · Kg/cm²) |
| --- | --- |
| Untreated | 8.9 |
| 50 | 10.1 |
| 60 | 10.5 |
| 70 | 10.6 |
| 80 | 10.5 |
| 90 | 10.4 |
| 100 | 10.5 |

COMPARATIVE EXAMPLE 1

Using the same polymer solution as in Example 1 and a nozzle shown in FIG. 13, the polymer solution was extruded and introduced into a coagulation vessel filled with water as a coagulant while the hollow portion of the resulting extruded polymer solution was also filled with water, to coagulate the extruded polymer solution from both outside and inside. The resulting hollow fiber type membrane had an inner diameter of 0.8 mm and an outer diameter of 1.6 mm. By using this hollow fiber type membrane, processing was carried out as in Example 1 and the water permeability was measured in the same manner as in Example 1. The results are shown in Table 2. When treatment was carried out with hot water at 80° C or higher, the water permeability became zero. If the results are shown by means of graph, a curve d shown in FIG. 9 is obtained.

Table 2

| Temperature of treatment with hot water (° C) | Water permeability (m³/m² · day · Kg/cm²) |
| --- | --- |
| Untreated | 4.2 |
| 50 | 3.5 |
| 60 | 1.4 |
| 70 | 0.2 |
| 80 | 0 |
| 90 | 0 |
| 100 | 0 |

Further, after the hollow fiber type membrane was dried at room temperature, the water permeability was measured to give a value of nearly zero.

COMPARATIVE EXAMPLE 2

Using the same polymer solution as in Example 1, a processing method as in Example 1, a braid of glass fiber yarns having a hollow portion and an outer diameter of 1.5 mm and an inner diameter of 0.7 mm, and a nozzle of 2.5 mm in diameter, a hollow fiber type membrane having an outer diameter of 2.5 mm and an inner diameter of 0.7 mm, as shown in FIG. 6, was prepared. As for the water permeability of the hollow fiber type membrane thus prepared, a curve c shown in FIG. 9 was obtained.

EXAMPLE 2

Fifteen grams of an acrylonitrile copolymer containing 10% by mol of methyl acrylate residual group was dissolved in 100 ml of a 75% aqueous nitric acid at −3° C, and the resulting solution was defoamed while being maintained at −3° C. Using this solution, the same processing method as in Example 1 and a braid having a hollow portion and made of polyester (polyethylene terephthalate) monofilaments and having an outer diameter of 1.8 mm and an inner diameter of 1.4 mm, a hollow fiber type semipermeable membrane having an outer diameter of 1.9 mm and an inner diameter of 1.3 mm, as shown in FIG. 5, was prepared. The water permeability of the tubular type semipermeable membrane thus prepared was measured in the same manner as in Example 1 to give results shown in Table 3. Further, after the hollow fiber type semipermeable composite membrane which had been treated with hot water to 80° C was dried, the water-permeability was measured to give 87 m³/m²·day·Kg/cm².

Table 3

| Temperature of treatment with hot water (° C) | Water permeability (m³/m² · day · Kg/cm²) |
| --- | --- |
| Untreated | 55 |
| 50 | 69 |
| 60 | 73 |
| 70 | 80 |
| 80 | 85 |
| 90 | 88 |
| 100 | 90 |

EXAMPLE 3

Twenty five grams of a acrylonitrile copolymer containing 10% by mol of methyl acrylate residual group was dissolved in 100 ml of a 75% aqueous nitric acid at −3° C, and the resulting solution was defoamed while being maintained at −3° C. Using this solution, the same processing method as in Example 1, a braid having a hollow portion and made of polyethylene terephthalate monofilaments and having an outer diameter of 1.8 mm and an inner diameter of 1.4 mm and a nozzle of 2.7 mm in diameter, a hollow fiber type semipermeable membrane having an outer diameter of 2.7 mm and an inner diameter of 1.3 mm, as shown in FIG. 4, was prepared. The water permeability of the tubular type semipermeable membrane thus prepared was measured in the same manner as in Example 1 to give results shown in Table 4. When the results are shown by means of graph, a curve b shown in FIG. 9 is obtained.

Table 4

| Temperature of treatment with hot water (° C) | Water permeability (m³/m² · day · Kg/cm²) |
| --- | --- |
| Untreated | 4.4 |
| 50 | 5.3 |
| 60 | 6.0 |
| 70 | 5.6 |
| 80 | 4.1 |
| 90 | 3.7 |
| 100 | 3.0 |

EXAMPLE 4

Twenty five grams of an acrylonitrile polymer containing 10% by mol of methyl acrylate residual group was dissolved in 100 ml of 75% aqueous nitric acid at −3° C, and the resulting solution was defoamed while being maintained at −3° C. The resulting solution was uniformly cast on a glass plate by means of a doctor blade so as to have thickness of 0.3 mm and 0.5 mm, and a polyester (polyethylene terephthalate) plain gauze having a thickness of 0.12 mm and a section number per unit length of 110 × 106/2.54 cm was placed on the respective cast polymer obtained above. After the surface of the polyester plain gauze was completely wetted with a nitric solution, the whole was immersed and coagulated in a large amount of water. After the coagulation, the resulting membrane was peeled off from the surface of the glass plate and then fully washed with water to give a membrane having thicknesses of 0.28 mm and 0.40 mm, respectively, which contained a gradient-type porous region adjacent to the surface of the polyester plain gauze on the side which had contacted the coagulation bath. Thus membrane containing the polymer plain gauze as a reinforcing material embedded therein, as shown in FIG. 7 was obtained.

With the semipermeable membrane thus prepared and membranes treated with hot water at various temperatures for 10 minutes, the water permeabilities and the percentage cut of dextrane having a molecular weight of 70,000 were measured without drying the above-mentioned membranes. The results are shown in Table 5.

Further, after the membrane treated with hot water at 90° C was dried, its permeability was measured to give 5.4 m³/m²·day·Kg/cm².

Furthermore, the burst strengths of the membranes were measured. The membranes having no reinforcing material embedded therein bursted under 0.7 Kg/cm², whereas those having a reinforcing material embedded therein did not burst even under 3 Kg/cm².

COMPARATIVE EXAMPLE 3

The same polymer solution as in Example 4 was uniformly cast on a glass plate by means of a doctor blade so as to give a thickness of 0.3 mm. The resulting cast solution, as it is, i.e. without putting a polyester plain gauze therein, was immersed and coagulated in a large amount of water as a coagulant to give a semiperemeable membrane without a reinforcing material. The membrane thus prepared and those treated with hot water at various temperatures for 10 minutes were subjected, without drying these membranes, to measurements of water permeability and percentage cut of dextrane having a molecular weight of 70,000. The results are shown in Table 6. It was found that treatment in hot water at 80° C or higher temperatures resulted in a membrane having a water permeability of zero.

Further, the value of the water permeability of the membrane coagulated in water and then dried at room temperature was nearly zero.

Table 5

Change in water permeability of semipermeable membranes having a reinforcing material embedded therein near the surface thereof

| Temperature of treatment with hot water (° C) | Water permeability (m³/m²·day·Kg/cm²) | | Percentage cut of dextrane (%) | |
| --- | --- | --- | --- | --- |
|  | 0.28 mm | 0.40 mm | 0.28 mm | 0.40 mm |
| Untreated | 4.1 | 4.0 | 22 | 47 |
| 50 | 4.8 | 5.0 | 20 | 33 |
| 60 | 5.5 | 5.4 | 18 | 30 |
| 70 | 6.0 | 6.0 | 15 | 18 |
| 80 | 6.1 | 5.9 | 11 | 18 |
| 90 | 6.4 | 6.1 | 7 | 12 |
| 100 | 6.6 | 6.1 | 4 | 12 |

Table 6

Change in water permeability of semipermeable membranes having no reinforcing material

| Temperature of treatment with hot water (° C) | Water permeability (m³/m²·day·Kg/cm²) | Percentage cut of dextrane (%) |
| --- | --- | --- |
| Untreated | 4.5 | 43 |
| 50 | 3.7 | 48 |
| 60 | 1.5 | 75 |
| 70 | 0.2 | 100 |
| 80 | 0 | — |
| 90 | 0 | — |

Table 6-continued

Change in water permeability of semipermeable membranes having no reinforcing material

| Temperature of treatment with hot water (° C) | Water permeability (m³/m²·day·Kg/cm²) | Percentage cut of dextrane (%) |
| --- | --- | --- |
| 100 | 0 | — |

COMPARATIVE EXAMPLE 4

The same polyester plain gauze as the one employed in Example 4 was placed on a glass plate. The same polymer solution as in Example 4 was uniformly cast thereon by means of a doctor blade so as to give a thickness of 0.6 mm. After the gauze was completely wetted with a nitric acid solution, the whole was immersed and coagulated in a large amount of water. After the coagulation, the resulting membrane was peeled off from the surface of the glass plate and then fully washed with water. The membrane thus prepared has a structure containing a polyester plain gauze in the part lower than the middle portion of the membrane, as shown in FIG. 8. The semipermeable membrane thus prepared and those treated in hot water at various temperatures for 10 minutes, were subjected, without drying, to measurements of water permeability and percentage cut of dextrane having a molecular weight of 70,000. The results are shown in Table 7.

Table 7

Change in water permeability of semipermeable membranes having a fabric embedded in the back side through hot-water treatment

| Temperature of treatment with hot water (° C) | Water permeability (m³/m²·day·Kg/cm²) | Percentage cut of dextrane (%) |
| --- | --- | --- |
| Untreated | 7.0 | 5 |
| 50 | 7.8 | 9 |
| 60 | 6.6 | 18 |
| 70 | 3.8 | 53 |
| 80 | 1.7 | 70 |
| 90 | 1.4 | 78 |
| 100 | 0.4 | 98 |

EXAMPLE 5

Fifteen grams of an acrylonitrile copolymer containing 10% by mol of methyl acrylate residual group was dissolved in 100 ml of 75% aqueous nitric acid at −3° C, and the resulting solution was defoamed while being maintained at −3° C. The resulting solution was uniformly cast on a glass plate by means of a doctor blade so as to give a thickness of 0.3 mm, and a polyester plain gauze having a thickness of 0.12 mm and a section number per unit length of 110 × 106/2.54 cm was placed on the cast polyester. After the surface of the polyester plain gauze was completely wetted with a nitric solution, the whole was immersed and coagulated in a large amount of water. After the coagulation, the resulting membranes were peeled off from the surface of the glass plate and then fully washed with water to give a membrane having a thickness of 0.25 mm, and also having a polyester plain gauze as an reinforcing-material embedded therein adjacent to a gradient-type porous region located on the surface of the side which had contacted with the coagulation bath. The semipermeable membrane and those treated in hot water at various temperatures for 10 minutes were subjected, without drying, to measurement of water-permeability. The results are shown in Table 8.

Table 8

| Temperature of treatment with hot water (° C) | Water permeability (m³/m² · day · Kg/cm²) |
| --- | --- |
| Untreated | 49 |
| 50 | 68 |
| 60 | 81 |
| 70 | 93 |
| 80 | 102 |
| 90 | 104 |
| 100 | 108 |

What is claimed is:

1. A semipermeable composite membrane consisting of a porous substance and a reinforcing material made of fibrous material embedded in the wall of the porous substance, at least one part of said porous substance forming a porous region of a network structure having pore sizes in the range from 500A to 5μ; said porous region containing a number of voids having diameters of 10μ or greater; and the ratio of water permeability of said membrane after one time treatment with hot water at 80° C or after drying at 20° C to the respective water permeability before said treatment being 0.3 or higher.

2. A semipermeable composite membrane according to claim 1 wherein the reinforcing material made of fibrous material is a fabric and the resultant semipermeable composite membrane is of flat shape.

3. A semipermeable composite membrane according to claim 1 wherein the reinforcing material made of fibrous material is a braid having a central hollow portion and the resultant semipermeable composite membrane is of a hollow fiber shape.

4. A semipermeable composite membrane according to claim 1 wherein the water permeability after one time treatment with hot water at 80° C or after drying at 20° C is 2 m³/m²·day·Kg/cm² or higher.

5. A semipermeable composite membrane according to claim 1 wherein a gradient-type porous region is included in at least one surface of said membrane.

6. A semiperemeable composite membrane according to claim 3 wherein said braid having a hollow portion is prepared by knitting monofilaments.

7. A semipermeable composite membrane according to claim 6 wherein said monofilaments are made of a polymer selected from the group consisting of polyesters, acrylonitrile polymers, nylons and polyolefins.

8. A semipermeable composite membrane according to claim 1 wherein said porous member is made of a copolymer mainly of acrylonitrile.

9. A method for producing a hollow fiber type semipermeable composite membrane containing an embedded braid having a central hollow portion which comprises feeding a polymer solution and a braid having a central hollow portion which is insoluble in the polymer solution, simultaneously to a spinning nozzle, impregnating the braid with the polymer solution inside the nozzle, taking out the braid impregnated with the polymer solution and introducing both the braid and the polymer solution into a liquid which does not dissolve the polymer to coagulate the polymer whereby a hollow fiber type semipermeable membrane consisting of a porous substance and a reinforcing material having a central hollow portion, defined in claim 1 is obtained.

* * * * *